United States Patent
Yamakawa

(10) Patent No.: US 11,258,292 B2
(45) Date of Patent: Feb. 22, 2022

(54) ELECTRONIC DEVICE, ELECTRONIC TIMEPIECE AND BATTERY CHARGING METHOD

(71) Applicant: CASIO COMPUTER CO., LTD., Tokyo (JP)

(72) Inventor: Eiji Yamakawa, Tama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 315 days.

(21) Appl. No.: 16/443,424

(22) Filed: Jun. 17, 2019

(65) Prior Publication Data
US 2019/0393715 A1 Dec. 26, 2019

(30) Foreign Application Priority Data
Jun. 21, 2018 (JP) .............................. JP2018-118169

(51) Int. Cl.
*H02J 7/00* (2006.01)
*H02J 7/35* (2006.01)
*G04G 19/00* (2006.01)
*H02J 7/02* (2016.01)
*G04C 10/02* (2006.01)

(52) U.S. Cl.
CPC ............... *H02J 7/35* (2013.01); *G04G 19/00* (2013.01); *H02J 7/0029* (2013.01); *H02J 7/00308* (2020.01); *H02J 7/027* (2013.01); *G04C 10/02* (2013.01); *H02J 2300/24* (2020.01)

(58) Field of Classification Search
CPC .......... H02J 7/35; H02J 7/027; H02J 7/00712; H02J 7/0071; H02J 2207/40; H02J 2300/24; H02J 3/381; H02J 7/00308; H02J 7/0029; G04G 19/00; G04C 10/02; Y02E 10/56
See application file for complete search history.

(56) References Cited

U.S. PATENT DOCUMENTS

| 4,666,313 | A | * | 5/1987 | Ganter | ................... | G04C 10/02 |
| | | | | | | 368/205 |
| 5,889,736 | A | * | 3/1999 | Fujita | ..................... | G04C 10/04 |
| | | | | | | 368/66 |
| 6,373,224 | B1 | * | 4/2002 | Goto | ........................ | H02J 7/35 |
| | | | | | | 320/119 |

(Continued)

FOREIGN PATENT DOCUMENTS

| EP | 2 503 665 A1 | 9/2012 |
| JP | 2000-197280 A | 7/2000 |

(Continued)

OTHER PUBLICATIONS

Extended European Search Report, dated Oct. 24, 2019, for European Application No. 19181082.9-1202.

*Primary Examiner* — Naum Levin
(74) *Attorney, Agent, or Firm* — Seed IP Law Group LLP

(57) ABSTRACT

An electronic device includes a rechargeable battery, a first battery charger that charges the rechargeable battery by power supplied from an external power supply, a second battery charger that charges the rechargeable battery by a solar panel, and a processor that charges the rechargeable battery to a first voltage by the first battery charger, and charges the rechargeable battery to a second voltage lower than the first voltage by the second battery charger.

9 Claims, 5 Drawing Sheets

(56) References Cited

U.S. PATENT DOCUMENTS

| | | | |
|---|---|---|---|
| 6,791,905 B1* | 9/2004 | Sekiguchi | G04G 9/0082 368/80 |
| 7,251,509 B1* | 7/2007 | Wang | H02J 7/35 455/574 |
| 7,327,638 B2* | 2/2008 | Nagata | G04F 5/06 368/64 |
| 8,922,156 B2* | 12/2014 | Shimura | H01M 10/48 320/101 |
| 9,941,733 B2* | 4/2018 | Ogasawara | G04G 21/04 |
| 10,658,866 B2* | 5/2020 | Kitazawa | H02J 7/00712 |
| 10,942,554 B2* | 3/2021 | Oyama | G01R 31/396 |
| 2010/0013428 A1* | 1/2010 | Shin | H02J 7/35 320/101 |
| 2010/0165797 A1 | 7/2010 | Asami et al. | |
| 2015/0213709 A1* | 7/2015 | Miller | G06Q 10/0833 340/693.2 |
| 2016/0252883 A1 | 9/2016 | Inoue | |
| 2016/0282817 A1 | 9/2016 | Kawaguchi et al. | |
| 2016/0342140 A1 | 11/2016 | Baba | |

FOREIGN PATENT DOCUMENTS

| | | |
|---|---|---|
| JP | 5707946 B2 | 4/2015 |
| JP | 2016-119735 A | 6/2016 |
| JP | 2016-152728 A | 8/2016 |

\* cited by examiner

ELECTRONIC DEVICE, ELECTRONIC TIMEPIECE AND BATTERY CHARGING METHOD

CROSS-REFERENCE TO RELATED APPLICATIONS

This application is based on and claims priority under 35 USC 119 from Japanese Patent Application No. 2018-118169 filed on Jun. 21, 2018, the contents of which are incorporated herein by reference.

TECHNICAL FIELD

The present invention relates to an electronic device, an electronic timepiece, and a battery charging method.

BACKGROUND ART

In the related art, an electronic timepiece which has a solar panel and a rechargeable battery and is driven by charging the rechargeable battery with power generated by the solar panel is known (see Japanese Patent Application Laid-Open No. 2000-197280 for instance). Since this electronic timepiece is driven by the rechargeable battery, and the rechargeable battery is charged by the solar panel, it is possible to achieve a life longer than those of electronic timepieces which are driven by primary batteries.

Also, there is an electronic timepiece in which a rechargeable battery is charged by a solar panel and an external power supply. Since charging using the external power supply is used together, even in an environment in which it is difficult to receive sunlight, it is possible to surely charge the rechargeable battery. Also, since it becomes possible to charge the rechargeable battery in a short time by charging using the external power supply, it is possible to make units which consume relatively large amounts of power operate.

The abstract of Japanese Patent Application Laid-Open No. 2000-197280 discloses "a regulator device which is for charging a battery using a solar cell and in which an on-operation setting voltage to start or restart supply of power from the solar cell and an off-operation setting voltage to shut off supply of power are set to different voltage values, and the off-operation setting voltage is set to a voltage value corresponding to the full charge of the battery or a voltage value close to the full charge during battery charging, and the on-operation setting voltage is set to a voltage value lower than a voltage value which is obtained by voltage drop if charging current is shut off by an off operation based on the off-operation setting voltage when the battery voltage has risen to the voltage value corresponding to the full charge of the battery or the voltage value close to the full charge by charging current".

In other words, the invention disclosed in Japanese Patent Application Laid-Open No. 2000-197280 performs external charging according to the charge voltage of the solar cell. According to the technology disclosed in Japanese Patent Application Laid-Open No. 2000-197280, in the case where the battery voltage is 12.5 V or lower, supply of power from the solar cell is started, and in the case where the battery voltage is 15.5 V or higher, supply of power from the solar cell is shut off. Therefore, the durability of the battery improves.

Also, Japanese Patent Application Laid-Open No. 2016-152728 discloses a charging system technology for setting a maximum value for charging current depending on the operation state of an imparted function.

If charging a rechargeable battery is always carried on, the life of the rechargeable battery shortens, and the durability is damaged. In a watch using solar charging using a solar battery and external charging together, the state where charging is carried on by solar charging may continue, the life of the rechargeable battery may shorten. Also, if considering the durability of the battery, the time related to charging the battery may increase.

SUMMARY OF INVENTION

In order to achieve the above-mentioned object, an electronic device of an embodiment includes: a rechargeable battery; a first battery charger that charges the rechargeable battery by power supplied from an external power supply; a second battery charger that charges the rechargeable battery by a solar panel; and a processor that charges the rechargeable battery to a first voltage by the first battery charger, and charges the rechargeable battery to a second voltage lower than the first voltage by the second battery charger.

DESCRIPTION OF EMBODIMENTS

Hereinafter, an embodiment will be described in detail with reference to the individual drawings.

Figure 1:
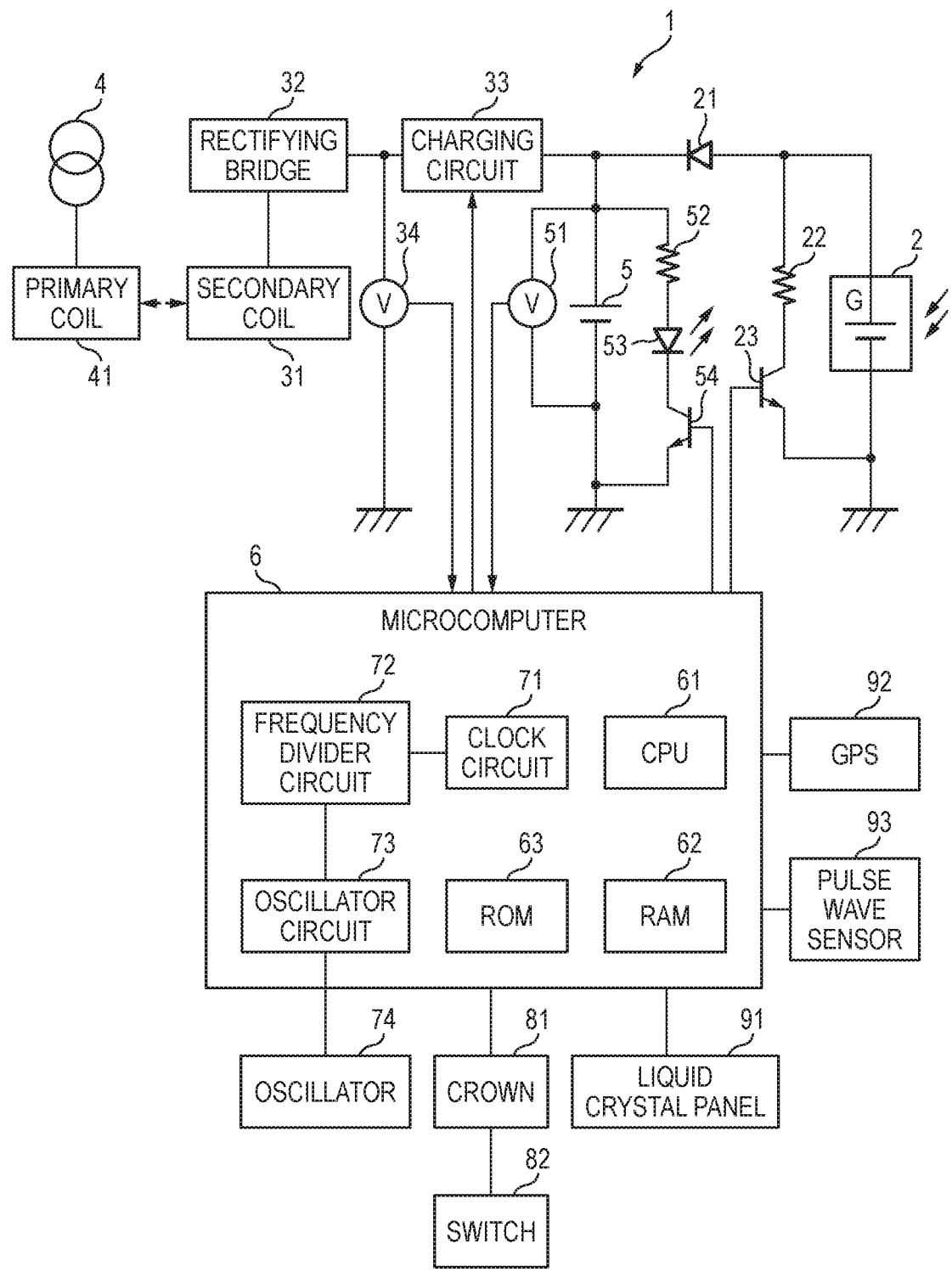
FIG. 1 is a rough configuration diagram illustrating an electronic timepiece of the present embodiment.

FIG. 1 is a rough configuration diagram illustrating an electronic timepiece 1 of the present embodiment.

The electronic timepiece 1 includes a solar panel 2 for solar charging, a rechargeable battery 5, a secondary coil 31 and a rectifying bridge 32 for external charging, and a charging circuit 33. Further, the electronic timepiece 1 includes a microcomputer 6, an oscillator 74, a crown 81 and a switch 82 which is an operation member, a liquid crystal panel 91 which is a display, a GPS (Global Positioning System) module 92, and a pulse wave sensor 93.

The microcomputer 6 is an LSI (Large-Scale Integration), and includes a CPU (Central Processing Unit) 61, a RAM (Random Access Memory) 62, and a ROM (Read Only Memory) 63. Further, the microcomputer 6 is configured to include an oscillator circuit 73, a frequency divider circuit 72, and a clock circuit 71 (a clock unit).

The CPU 61 performs a variety of arithmetic processing, and generally controls the operation of the whole of the electronic timepiece 1. The CPU 61 reads out a control program stored in the ROM 63, and executes the control program, thereby making the individual units continuously perform operations related to time display. Further, on the basis of an input operation on the crown 81 or the switch 82, the CPU 61 makes the required operation be performed in real time or at a set timing. The CPU 61 is a display control means for controlling display of the liquid crystal panel 91 on the basis of time information measured by the clock circuit 71, and so on.

The GPS module 92 receives radar waves (specifically, GPS signals) transmitted from GPS satellites, thereby acquiring location and time information represented by the GPS signals, and outputs the location and time information to the CPU 61.

The pulse wave sensor 93 is, for example, one or more light receiving elements. When measuring the pulse wave of the user, the CPU 61 irradiates a part of the skin for observing the pulse wave with visible light by a light emitting diode 53. The CPU 61 receives light scattered by blood existing in the blood vessel near the observation part, as reflected light, thereby outputting an output signal (an observation signal) according to the amount of received light. In this way, the CPU 61 can measure the pulse wave of the user.

The oscillator circuit 73 generates a unique frequency signal, and outputs the unique frequency signal to the frequency divider circuit 72. As the oscillator circuit 73, for example, a circuit which oscillates in cooperation with the oscillator 74 such as crystal can be used. The frequency divider circuit 72 divides the signal input from the oscillator circuit 73 into signals having various frequencies to be used in the CPU 61 and the clock circuit 71, and outputs the signals. The clock circuit 71 is a counter circuit which counts the current time by counting the number of pulses of a predetermined frequency signal input from the frequency divider circuit 72 and adding the number of pulses to an initial time. The current time which is counted by the clock circuit 71 is read out by the CPU 61, and is used in time display. This time counting may be controlled in software wise.

The rechargeable battery 5 is a power supply for continuously and stably operating the electronic timepiece 1 over a long period, and external charging and solar charging are possible. The clock unit can be operated with a power-supply voltage of 3.9 V or higher, but the GPS module 92, the pulse wave sensor 93, and so on are operated only with a power-supply voltage of 4.1 V or higher. The rechargeable battery 5 is configured to be able to raise the voltage to 4.2 V in order to use the GPS module 92, the pulse wave sensor 93, and so on only for a short period.

An external power supply 4 is a commercial AC power supply, and is connected to a primary coil 41. The secondary coil 31 is close to the primary coil 41, thereby receiving power from the external power supply 4. The rectifying bridge 32 rectifies alternating current which is generated in the secondary coil 31 into direct current. To the output side of the rectifying bridge 32, a voltage sensor 34 is connected. The microcomputer 6 detects whether the external power supply is connected to the electronic timepiece 1, by an output signal of the voltage sensor 34.

The charging circuit 33 converts the direct current rectified by the rectifying bridge into 4.2 V which is an external charge voltage. The charging circuit 33 is a first battery charger for charging the rechargeable battery 5 with power supplied from the external power supply 4. The microcomputer 6 can switch whether to perform external charging, by controlling the charging circuit 33. In other words, the microcomputer 6 is a control means for charging the rechargeable battery 5 to 4.2 V (a first voltage) by the charging circuit 33.

The negative electrode of the solar panel 2 is connected to a ground, and is connected to a diode 21 for preventing reverse current such that the current flows from the positive electrode of the solar panel 2 toward the positive electrode of the rechargeable battery 5. The diode 21 prevents the external charge voltage from being applied to the solar panel 2. The above-mentioned solar panel 2 is a second battery charger for charging the rechargeable battery 5.

The voltage which the solar panel 2 generates is the sum of 4.0 V which is a setting voltage and the amount of forward voltage drop of the diode 21. The charge voltage of the rechargeable battery 5 by solar charging becomes 4.0 V.

Between the positive electrode and negative electrode of the solar panel 2, a resistor 22 and a switch element 23 connected in series are connected. The switch element 23 is a first switch for connecting and disconnecting the positive electrode and negative electrode of the solar panel 2 to or from each other. The microcomputer 6 prohibits solar charging by turning on the switch element 23, and allows solar charging by turning off the switch element 23. The microcomputer 6 is a control means for turning on the switch element 23 if the voltage of the rechargeable battery 5 is 4.0 V (a second voltage) or higher and turning off the switch element 23 if the voltage of the rechargeable battery 5 is lower than 3.9 V (a third voltage).

The negative electrode of the rechargeable battery 5 is connected to the ground, and the positive electrode of the rechargeable battery 5 is connected to the output terminal of the charging circuit 33 and the cathode terminal of the diode 21, and a voltage sensor 51 for detecting this voltage is connected. The microcomputer 6 detects the voltage of the rechargeable battery 5 on the basis of the output signal of the voltage sensor 51.

The positive electrode of the rechargeable battery 5 is connected to the individual units of the electronic timepiece 1, and supplies power stored in the rechargeable battery 5. To the positive electrode of the rechargeable battery 5, the light emitting diode 53 and a resistor 52 connected in series, and a switch element 54 for turning on the light emitting diode 53 are connected.

The resistor 52 and the light emitting diode 53 are loads connected to the rechargeable battery 5. The switch element 54 is a second switch for turning on and off the loads.

Here, if the microcomputer 6 turns on the switch element 54, the light emitting diode 53 is turned on. In this case, the microcomputer 6 can consume the power of the rechargeable battery 5. The microcomputer 6 turns on the switch element 54 if the voltage of the rechargeable battery 5 is 4.1 V (a fourth voltage) or higher over a predetermined period.

Figure 2:
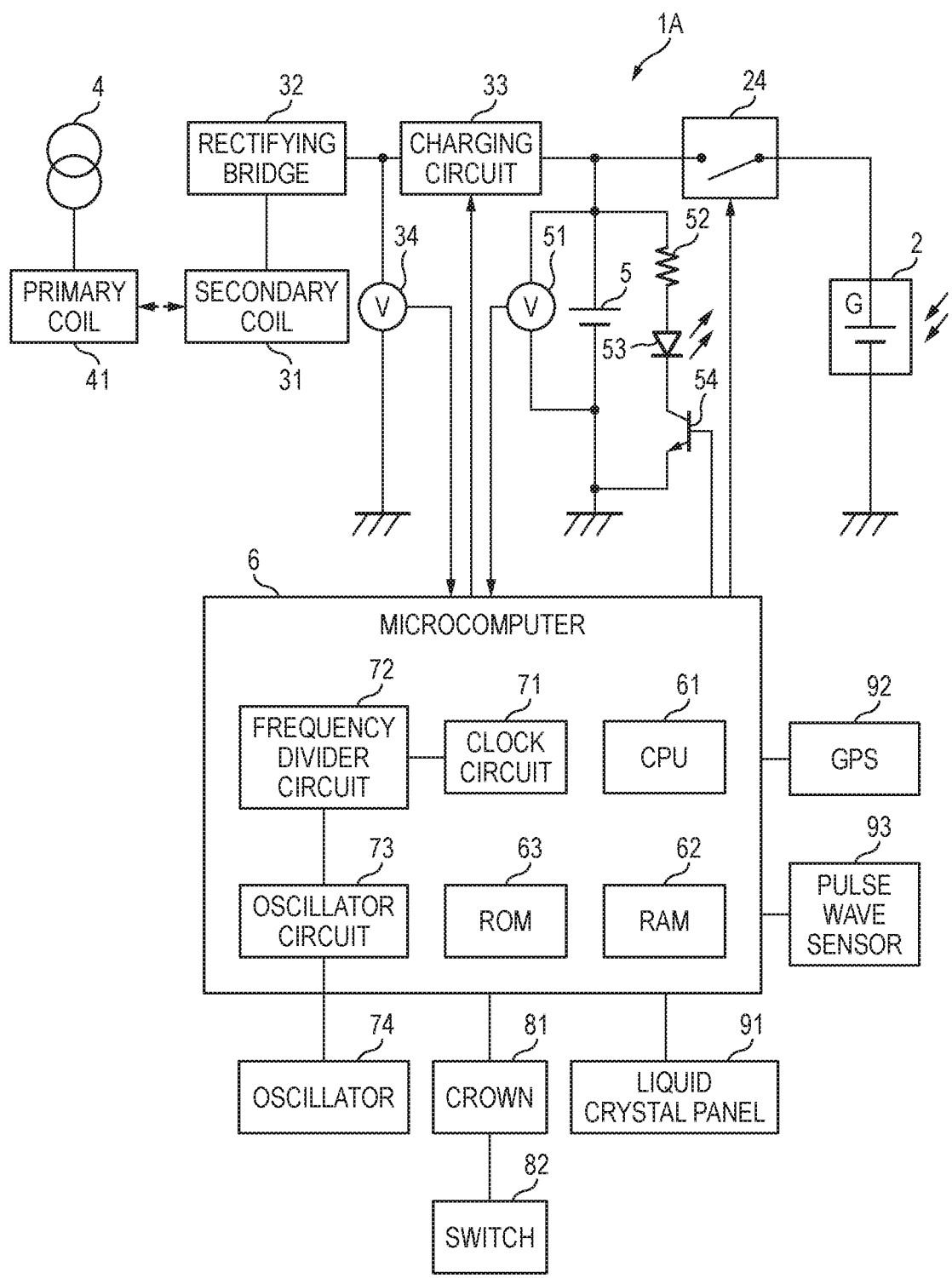
FIG. 2 is a rough configuration diagram illustrating an electronic timepiece of a modification.

FIG. 2 is a rough configuration diagram illustrating an electronic timepiece 1A of a modification.

Unlike the electronic timepiece 1 shown in FIG. 1, the electronic timepiece 1A does not have the resistor 22 and the switch element 23, and in place of the diode 21, a switch unit 24 is connected. The CPU 61 switches between prohibition and allowance of solar charging by the switch unit 24. The CPU 61 turns off the switch unit 24 when the external power supply 4 is connected, thereby preventing the external charge voltage from being applied to the solar panel 2. The other configuration is identical to that of the electronic timepiece 1 shown in FIG. 1.

Hereinafter, the operation of the electronic timepiece 1 of the present embodiment will be mainly described, and the operation of the electronic timepiece 1A of the modification will be complementally described.

If the rechargeable battery 5 holds 4.2 V, deterioration is significant. Since the consumption current of the clock unit of the electronic timepiece 1 is small, the rechargeable battery 5 may hold 4.2 V over a long period even though it is not being charged.

In the rechargeable battery 5, the state in which charging is always carried on significantly influences the life of the battery. In the electronic timepiece 1, since the system using solar and external charging together is taken, in solar charging, the state in which charging is carried on may continue. Therefore, by setting the charge voltage for solar charging to be low, it is possible to extend the life of the battery.

This time, in order to use the GPS module 92 and the pulse wave sensor 93 for a short period, not in order for the clock unit, the voltage of the rechargeable battery 5 is raised to a voltage between 4.0 V and 4.2 V.

However, if the charge voltage is set as described above, the battery capacity decreases. For this reason, the setting voltage for solar charging and the setting voltage for external charging are separated, and charging is performed, whereby it is possible to carry on the operation by solar charging while protecting the rechargeable battery 5.

For example, by solar charging, charging is performed until the voltage of the rechargeable battery 5 becomes 4.0 V. By external charging, charging is performed until the voltage of the rechargeable battery 5 becomes 4.2 V.

If the voltage of the rechargeable battery 5 is 4.0 V or lower, solar charging and external charging become possible. If the voltage of the rechargeable battery 5 exceeds 4.0 V, solar charging becomes impossible, and only external charging becomes possible. If the voltage of the rechargeable battery 5 exceeds 4.2 V, external charging becomes impossible. This charging process will be described with reference to the flow chart of FIG. 3.

Figure 3:
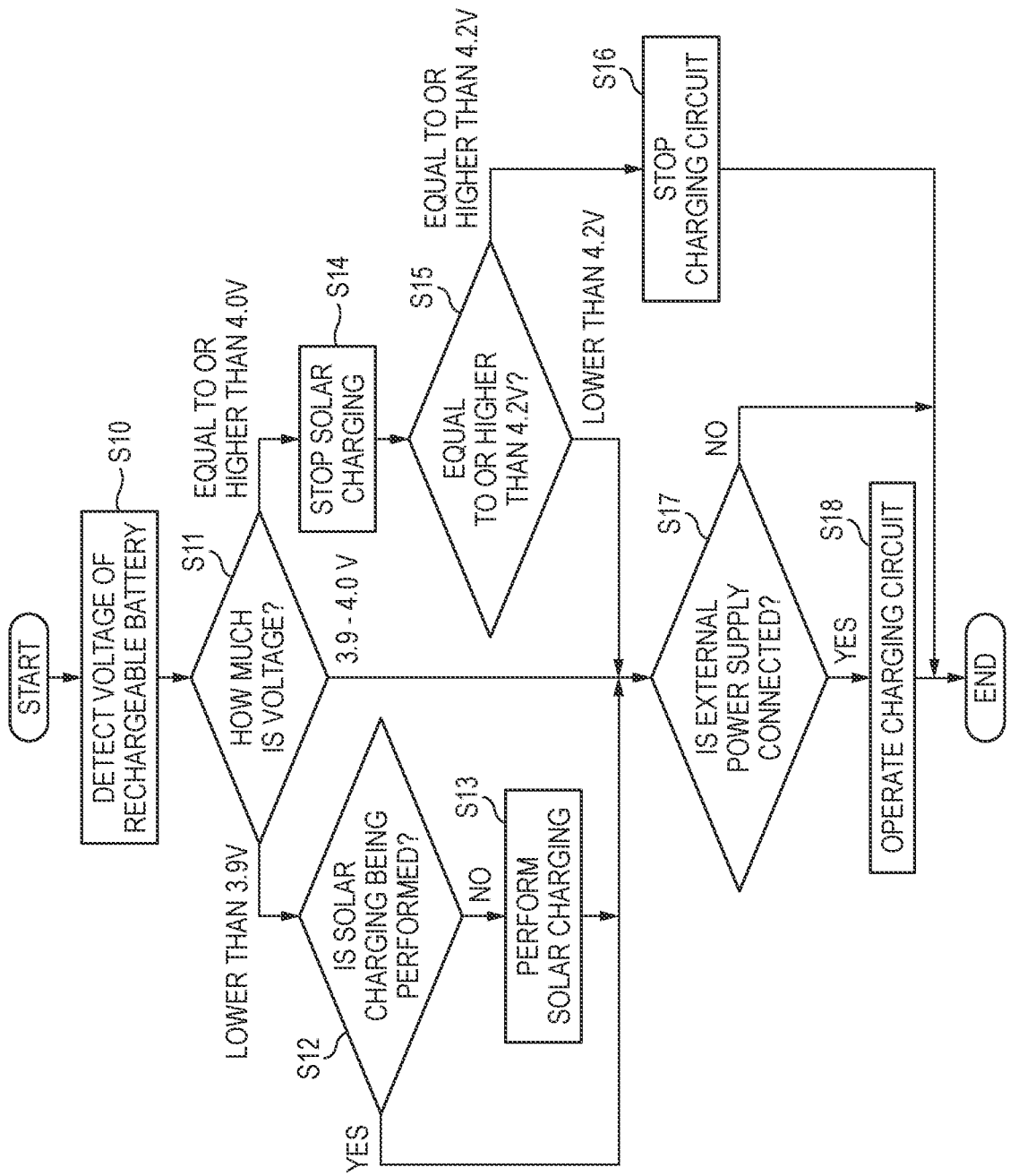
FIG. 3 is a flow chart illustrating a process of charging a rechargeable battery.

FIG. 3 is the flow chart illustrating the process of charging the rechargeable battery 5. This process is repeatedly performed in a predetermined cycle, for example, by a timer or the like.

The CPU 61 detects the voltage of the rechargeable battery 5 by the voltage sensor 51 (STEP S10), and performs determination on this voltage (STEP S11). In STEP S11, if the voltage of the rechargeable battery 5 is lower than 3.9 V, the CPU 61 determines whether the rechargeable battery 5 is being charged by the second battery charger (STEP S12).

In the case where it is determined in STEP S12 that the rechargeable battery 5 is not being charged by the second battery charger (No), the CPU 61 performs solar charging (STEP S13), and proceeds to the process of STEP S17. Specifically, the CPU 61 turns off the switch element 23. As a result, when the solar panel 2 is generating power, 4.0 V is applied to the rechargeable battery 5. Further, the current flows from the positive electrode of the solar panel 2 to the rechargeable battery 5 via the diode 21, whereby the rechargeable battery 5 is charged.

Meanwhile, in the case of the modification shown in FIG. 2, the CPU 61 turns on the switch unit 24. As a result, when the solar panel 2 is generating power, 4.0 V is applied to the rechargeable battery 5.

In the case where it is determined in STEP S12 that the rechargeable battery 5 is being charged by the second battery charger (Yes), the CPU 61 proceeds to the process of STEP S17 while maintaining that state.

If it is determined in STEP S11 that the voltage of the rechargeable battery 5 is equal to or higher than 3.9 V and is lower than 4.0 V, the CPU 61 proceeds to the process of STEP S17.

If it is determined in STEP S11 that the voltage of the rechargeable battery 5 is equal to or higher than 4.0 V, the CPU 61 stops solar charging (STEP S14), and proceeds to the process of STEP S16. Specifically, the CPU 61 turns on the switch element 23. As a result, when the solar panel 2 is generating power, the current flows from the positive electrode of the solar panel 2 via the resistor 22 and the switch element 23. Therefore, solar charging stops.

Meanwhile, in the case of the modification shown in FIG. 2, the CPU 61 turns off the switch unit 24. As a result, solar charging stops.

After solar charging is stopped in STEP S13, the CPU 61 determines whether the voltage of the rechargeable battery 5 is equal to or higher than 4.2 V, or not (STEP S15). If the voltage of the rechargeable battery 5 is equal to or higher than 4.2 V, the CPU 61 stops the charging circuit 33 (STEP S16), and ends the process of FIG. 3. Specifically, the CPU 61 stops the charging circuit 33, thereby preventing the voltage of the external power supply from being applied to the rechargeable battery 5. In this way, the CPU 61 can prevent external charging from being thereafter performed, regardless of whether the external power supply is connected.

In STEP S17, the CPU 61 determines whether the external power supply 4 is connected, on the basis of the output signal of the voltage sensor 34. Specifically, if the voltage sensor 34 has detected a voltage in a predetermined range, the CPU 61 determines that the external power supply 4 is connected. If the voltage detected by the voltage sensor 34 is lower than a predetermined value, the CPU 61 determines that the external power supply 4 is not connected.

If it is determined in STEP S17 that the external power supply 4 is connected (Yes), the CPU 61 operates the charging circuit 33 (STEP S18), thereby performing external charging, and ends the process of FIG. 3. Specifically, the CPU 61 operates the charging circuit 33 such that the voltage of 4.2 V of the external power supply is applied to the rechargeable battery 5. If it is determined that the external power supply 4 is not connected (No), the CPU 61 ends the process of FIG. 3.

Figure 4:
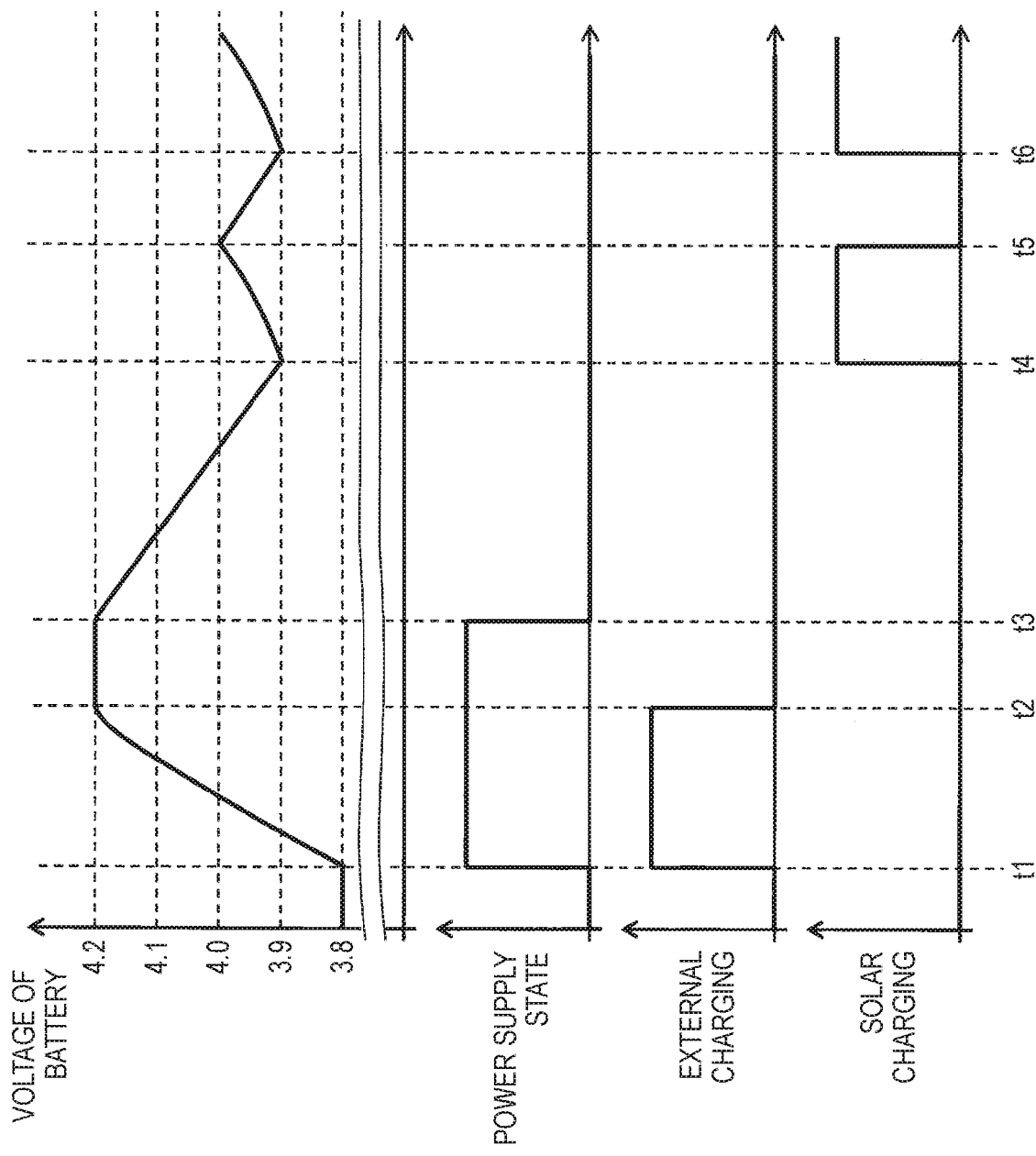
FIG. 4 is a time chart for explaining an external charging operation and a solar charging operation.

FIG. 4 is a time chart for explaining the external charging operation and the solar charging operation.

Before a time point t1, the voltage of the rechargeable battery 5 of the electronic timepiece 1 is 3.8 V.

The time point t1 is the time point when the user mounts the electronic timepiece 1 on a charger. Therefore, the secondary coil 31 of the electronic timepiece 1 becomes a power supply state, and external charging is performed on the rechargeable battery 5. Therefore, the voltage of the rechargeable battery 5 gradually rises. The period from the time point t1 to a time point t2 is a step of charging the rechargeable battery 5 to 4.2 V (the first voltage) by the charging circuit 33.

The time point t2 is the time point when the voltage of the rechargeable battery 5 becomes 4.2 V or higher. Therefore, external charging on the rechargeable battery 5 stops.

A time point t3 is the time point when the user wears the electronic timepiece 1 on an arm. Therefore, since the electronic timepiece 1 and the charger are separated, supply of power stops. With the operation of the electronic timepiece 1, the voltage of the rechargeable battery 5 gradually lowers.

A time point t4 is the time point when the voltage of the rechargeable battery 5 becomes lower than 3.9 V. Therefore, solar charging on the rechargeable battery 5 starts. Thereafter, the voltage of the rechargeable battery 5 gradually rises. The period from the time point t4 to a time point t5 is a step of charging the rechargeable battery 5 to 4.0 V (the second voltage) by the diode 21.

The time point t5 is the time point when the voltage of the rechargeable battery 5 becomes 4.0 V or higher. Therefore, solar charging on the rechargeable battery 5 stops. Thereafter, the voltage of the rechargeable battery 5 gradually lowers. As described above, if the voltage of the rechargeable battery 5 becomes 4.0 V, the CPU 61 stops solar charging until the voltage of the rechargeable battery 5 drops to 3.9 V. In this way, it is possible to prevent trickle charging, and extend the life of the rechargeable battery 5.

A time point t6 is the time point when the voltage of the rechargeable battery 5 becomes lower than 3.9 V. Therefore, solar charging on the rechargeable battery 5 starts. Thereafter, the voltage of the rechargeable battery 5 gradually rises. As described above, by repeatedly charging the rechargeable battery between 3.9 V and 4.0 V, it is possible to extend the life of the rechargeable battery 5 as compared to the case of always performing solar charging.

Figure 5:
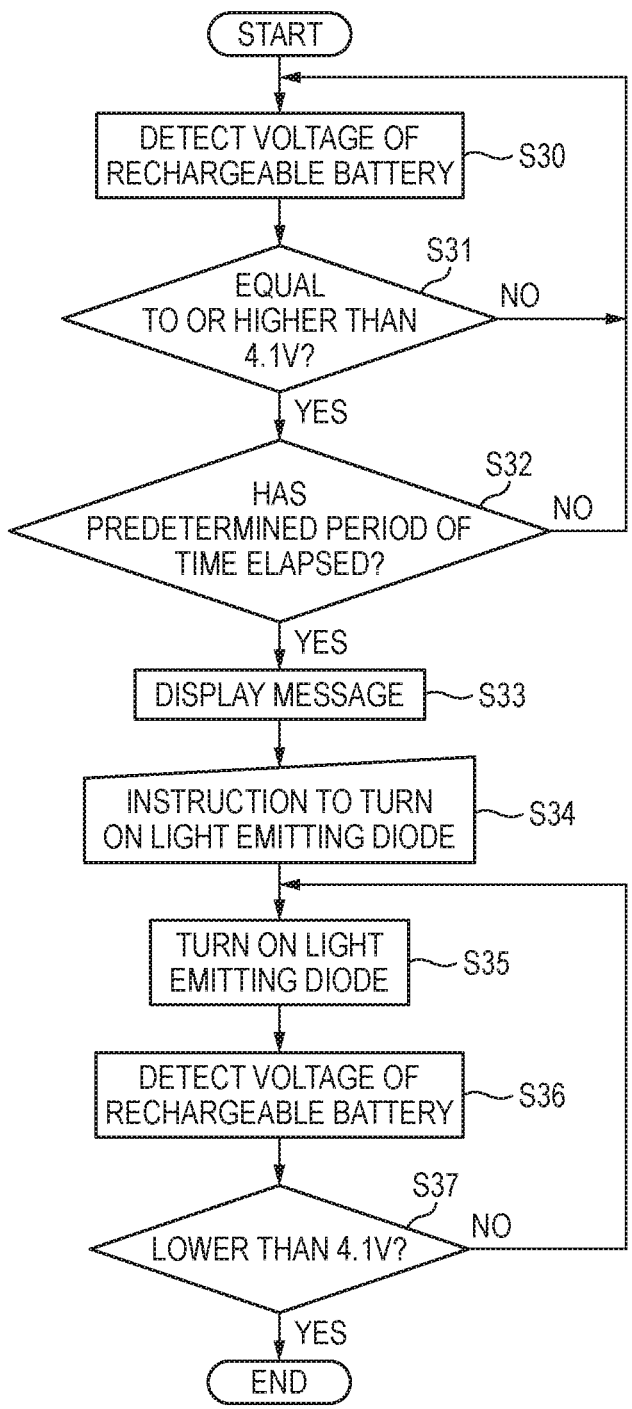
FIG. 5 is a flow chart illustrating a process of discharging the rechargeable battery.

FIG. 5 is a flow chart illustrating the process of discharging the rechargeable battery 5.

This discharging process is the process of lowering the voltage of the rechargeable battery 5 to a voltage lower than 4.1 V by turning on the power consumption devices such as the light emitting diode 53, in the case where the full charge state of the rechargeable battery 5 has continued for a long time. Therefore, although the life of the rechargeable battery 5 was about two years, it is expected to extend the life to about 5 years. This discharging process also is repeatedly performed in a predetermined cycle, for example, by a timer or the like, similarly to the process of FIG. 3.

The CPU 61 detects the voltage of the rechargeable battery 5 by the voltage sensor 51 (STEP S30), and determines whether this voltage is equal to or higher than 4.1 V, or not (STEP S31). If it is determined in STEP S31 that the voltage of the rechargeable battery 5 is lower than 4.1 V, the CPU 61 returns to the process of STEP S30; whereas if the voltage of the rechargeable battery 5 is equal to or higher than 4.1 V, the CPU proceeds to the process of STEP S32.

In STEP S32, the CPU 61 determines whether the state in which the voltage of the rechargeable battery is equal to or higher than 4.1 V has continued over a predetermined period. If this state has not continued over the predetermined period, the CPU 61 returns to the process of STEP S30; whereas if this state has continued over the predetermined period, the CPU proceeds to the process of STEP S33.

In STEP S33, the CPU 61 displays a message "Do you want to perform the discharging process in order to extend the life of the battery?" on the liquid crystal panel 91. The liquid crystal panel 91 is a display for displaying information.

Next, the user inputs an instruction to turn on the light emitting diode 53, by operating the switch 82 or the like (STEP S34). The switch 82 is an operating member for inputting operation information. If the voltage of the rechargeable battery 5 is equal to or higher than 4.1 V (the fourth voltage) over the predetermined period, the CPU 61 displays a message that it is required to turn on the loads, on the liquid crystal panel 91, and acquires an instruction to turn on the loads, by the switch 82.

The CPU 61 turns on the light emitting diode 53 by turning on the switch element 54 (STEP S35). The CPU 61 detects the voltage of the rechargeable battery 5 by the voltage sensor 51 (STEP S36), and determines whether this voltage is lower than 4.1 V (STEP S37). If it is determined in STEP S37 that the voltage of the rechargeable battery 5 is equal to or higher than 4.1 V, the CPU 61 returns to the process of STEP S35; whereas the voltage of the rechargeable battery 5 is lower than 4.1 V, the CPU ends the process of FIG. 5.

The electronic timepiece 1 of the present embodiment charges the rechargeable battery 5 using the plurality of different charging systems together. For each of these charging systems, the charge voltage of the rechargeable battery 5 is set in advance. Therefore, it is possible to perform solar charging with a low charge voltage for securing the life of the rechargeable battery 5. Further, in the case of external charging, since it is possible to perform charging with a high charge voltage, it is possible to efficiently secure the battery capacity, and it is possible to operate the functions requiring large amounts of current, such as the light emitting diode 53 and the GPS module 92.

The electronic timepiece 1 of the present embodiment can charge the rechargeable battery 5 using the plurality of different charging systems together. In using these charging systems, the following modifications also can be considered. The electronic timepiece 1 of the present embodiment starts solar charging if the voltage of the rechargeable battery 5 becomes lower than 3.9 V; however, this value may be changed. For example, the CPU 61 may acquire information such as the case where the external charging operation is frequently performed (for example, once a day), and the tendency when external charging is used (when external charging is used, every time, charging is completed to 4.2 V), and change the voltage of the rechargeable battery 5 to start solar charging, on the basis of that information. In the case where the external charging operation is frequently performed, since the possibility of interfering with the operation of the electronic timepiece 1 is low, the voltage of the rechargeable battery to start solar charging may be changed to a value lower than 3.9 V. In this case, the effect of extending the life of the rechargeable battery 5 is expected.

(Modifications)

Also, the present invention is not limited to the above-described embodiment, and modifications can be made without departing from the spirit of the present invention, and there are, for example, the followings (a) to (d).

(a) The user may select a setting voltage for external charging by a setting screen. In this case, the user can select whether to often use the GPS function, the pulse wave function, or the like, or extend the battery life.

(b) The voltage to allow solar charging, and the voltage to stop (prohibit) solar voltage may be the same.

(c) The method of detecting whether the external power supply is connected is not limited to detection of the output voltage of the rectifying bridge, and may be detection of an identification signal of the charger in wireless power supply.

(d) The method of connecting the external power supply and the device is not limited to wireless power supply, and may be wire-line connection.

What is claimed is:

1. An electronic device comprising:
   a rechargeable battery;
   a first battery charger that charges the rechargeable battery by power supplied from an external power supply;
   a second battery charger that charges the rechargeable battery by a solar panel; and
   a processor which, in operation, stops charging by the first battery charger when the rechargeable battery is charged such that a terminal voltage of the rechargeable battery is a first voltage while being charged by the first battery charger, and stops charging by the second battery charger when the rechargeable battery is charged such that the terminal voltage of the rechargeable battery is a second voltage lower than the first voltage while being charged by the second battery charger.

2. The electronic device according to claim 1, wherein the second battery charger includes a diode that is connected such that current flows from a positive electrode of the solar panel toward a positive electrode of the rechargeable battery.

3. The electronic device according to claim 2, wherein the processor, in operation, starts the charging by the second battery charger when the rechargeable battery is discharged such that the terminal voltage of the rechargeable battery is lower than a third voltage lower than the second voltage while not being charged by the second battery charger.

4. The electronic device according to claim 1, wherein in a case where power is not supplied from the external power supply, the processor stops the charging by the second battery charger when the rechargeable battery is charged such that the terminal voltage of the rechargeable battery is the second voltage while being charged by the second battery charger.

5. The electronic device according to claim 1, further comprising:
a load connected to the rechargeable battery; and
a second switch for turning on and off the load,
wherein the processor turns on the second switch when the terminal voltage of the rechargeable battery is equal to or higher than a fourth voltage between the first voltage and the second voltage over a predetermined period.

6. The electronic device according to claim 5, further comprising:
a display that displays information; and
an operating member that inputs operation information,
wherein when the terminal voltage of the rechargeable battery is equal to or higher than the fourth voltage over the predetermined period, the processor causes the display to display information representing that the load is turned on and causes the operating member to obtain an instruction to turn on the load.

7. The electronic device according to claim 1, wherein the electronic device is an electronic timepiece that displays time measured by a clock circuit.

8. A battery charging method performed by an electronic device, wherein
the electronic device includes a rechargeable battery, a first battery charger that charges the rechargeable battery by power supplied from an external power supply, a second battery charger that charges the rechargeable battery by a solar panel, and a processor, and
the battery charging method comprises:
stopping charging by the first battery charger when the rechargeable battery is charged such that a terminal voltage of the rechargeable battery is a first voltage while being charged by the first battery charger; and
stopping charging by the second battery charger when the rechargeable battery is charged such that the terminal voltage of the rechargeable battery is a second voltage lower than the first voltage while being charged by the second battery charger.

9. A non-transitory computer-readable storage medium storing a program that, when executed by a processor of an electronic device including a rechargeable battery, a first battery charger that charges the rechargeable battery by power supplied from an external power supply, and a second battery charger that charges the rechargeable battery by a solar panel causes the processor to:
stop charging by the first battery charger when the rechargeable battery is charged such that a terminal voltage of the rechargeable battery is a first voltage while being charged by the first battery charger; and
stop charging by the second battery charger when the rechargeable battery is charged such that the terminal voltage of the rechargeable battery is a second voltage lower than the first voltage while being charged by the second battery charger.

* * * * *